(12) United States Patent
Demoss

(10) Patent No.: US 10,825,475 B1
(45) Date of Patent: Nov. 3, 2020

(54) SYSTEM AND METHOD FOR IMPROVING HARD DISK DRIVE PERFORMANCE

(71) Applicant: DELL PRODUCTS, LP, Round Rock, TX (US)

(72) Inventor: Jeffrey J. Demoss, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 16/655,894

(22) Filed: Oct. 17, 2019

(51) Int. Cl.
| G11B 5/09 | (2006.01) |
| G11B 15/60 | (2006.01) |
| G11B 5/55 | (2006.01) |
| G11B 5/56 | (2006.01) |
| G11B 5/584 | (2006.01) |
| G11B 3/00 | (2006.01) |

(52) U.S. Cl.
CPC ............ *G11B 15/602* (2013.01); *G11B 3/001* (2013.01); *G11B 5/556* (2013.01); *G11B 5/56* (2013.01); *G11B 5/584* (2013.01)

(58) Field of Classification Search
None
See application file for complete search history.

(56) References Cited

U.S. PATENT DOCUMENTS

| 7,224,543 B1* | 5/2007 | Abrishamchian .. G11B 5/59627 360/60 |
| 8,867,153 B1* | 10/2014 | Coker .................. G11B 5/012 360/31 |
| 9,324,362 B1* | 4/2016 | Gao .................. G11B 20/1833 |
| 2013/0083416 A1* | 4/2013 | Kasiraj ................. G11B 5/012 360/39 |
| 2013/0250447 A1* | 9/2013 | Erden .................. G11B 5/3948 360/51 |
| 2014/0055883 A1* | 2/2014 | Dhanda ............. G11B 5/59694 360/77.08 |
| 2015/0109700 A1* | 4/2015 | Kashiwase ............... G11B 5/09 360/77.04 |

* cited by examiner

*Primary Examiner* — Peter Vincent Agustin
(74) *Attorney, Agent, or Firm* — Larson Newman, LLP

(57) ABSTRACT

A hard disk drive includes a disk having a servo region and data tracks. The servo region has servo data for formatting some of the data tracks for high capacity storage and others of the data tracks for low capacity storage. A head writes user data to the high capacity tracks in response to vibration less than a threshold value, and otherwise writes the user data to the low capacity tracks.

20 Claims, 8 Drawing Sheets

SYSTEM AND METHOD FOR IMPROVING HARD DISK DRIVE PERFORMANCE

FIELD OF THE DISCLOSURE

This disclosure generally relates to information handling systems, and more particularly relates to hard disk drive servo systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A hard disk drive includes a vibration compensation system. Servo data predefines tracks for writing data during normal operation when vibration is low. The servo data also predefines and reserves other tracks for writing data during vibration events. The servo data thus creates one or more dynamic zones, or dynamic cache, during vibration events. Buffer zones are preformatted at reduced or scaled down densities that increase track width. During normal operation, when vibration is low, data is written to the tracks at normal or default density. However, when vibration is sensed, write operations are switched to the other tracks reserved at a lower density for increased reliability.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
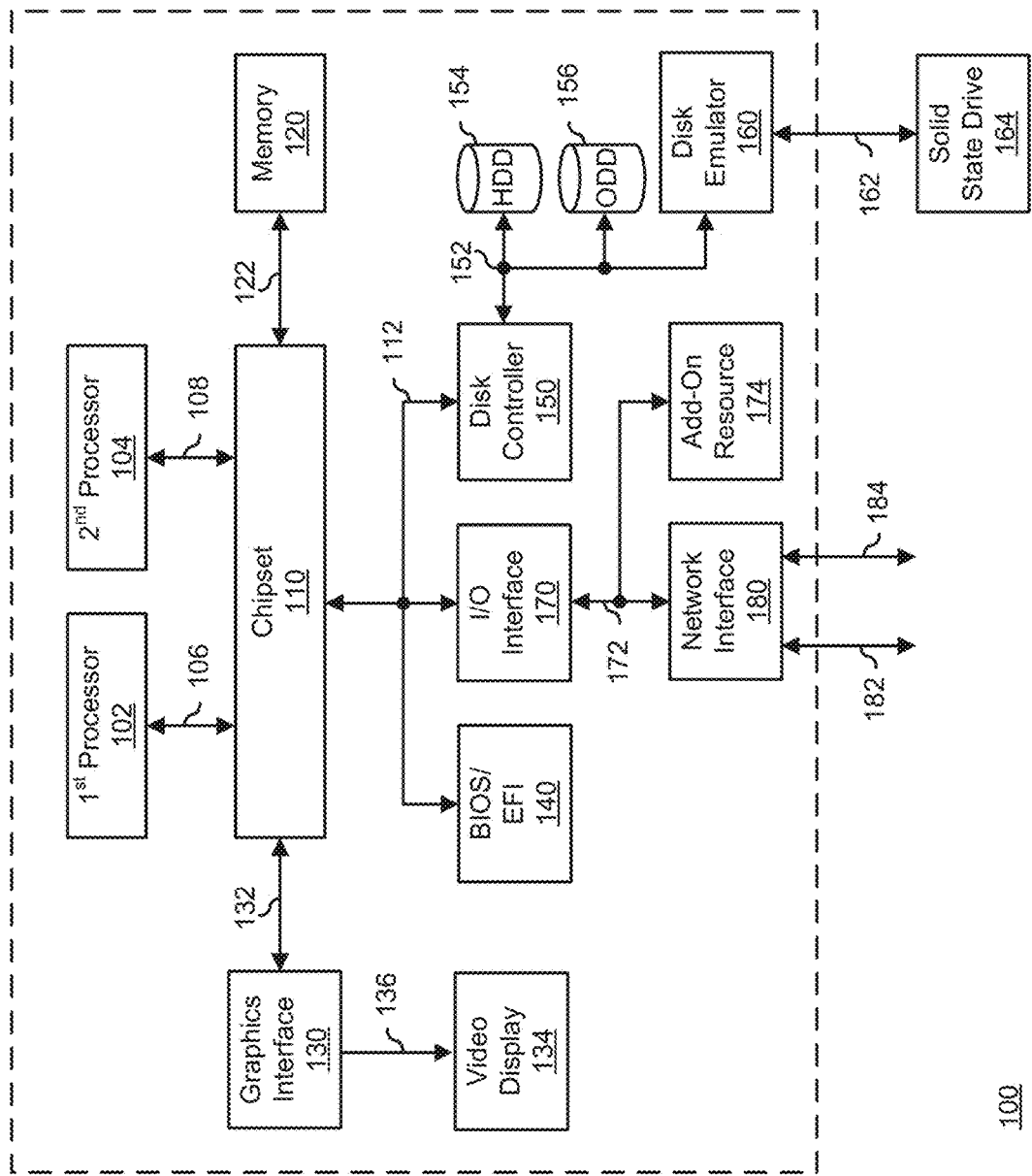
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface device 180, and a baseboard management controller (BMC) 190. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processors 102 and 104, which provides various management functions for information handling system 100. In an embodiment, BMC 190 may be responsible for granting access to a remote management system that may establish control of the elements to implement power management, cooling management, storage management, and the like. The BMC 190 may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated into another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100. Thus BMC 190 can communicate with the remote management system via network interface 194 or the BMC can communicate with the external mobile device using its own transceiver circuitry while the resources or elements of information handling system 100 are powered off or at least in low power mode. Here, information can be sent from the remote management system or external mobile device to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Figure 2:
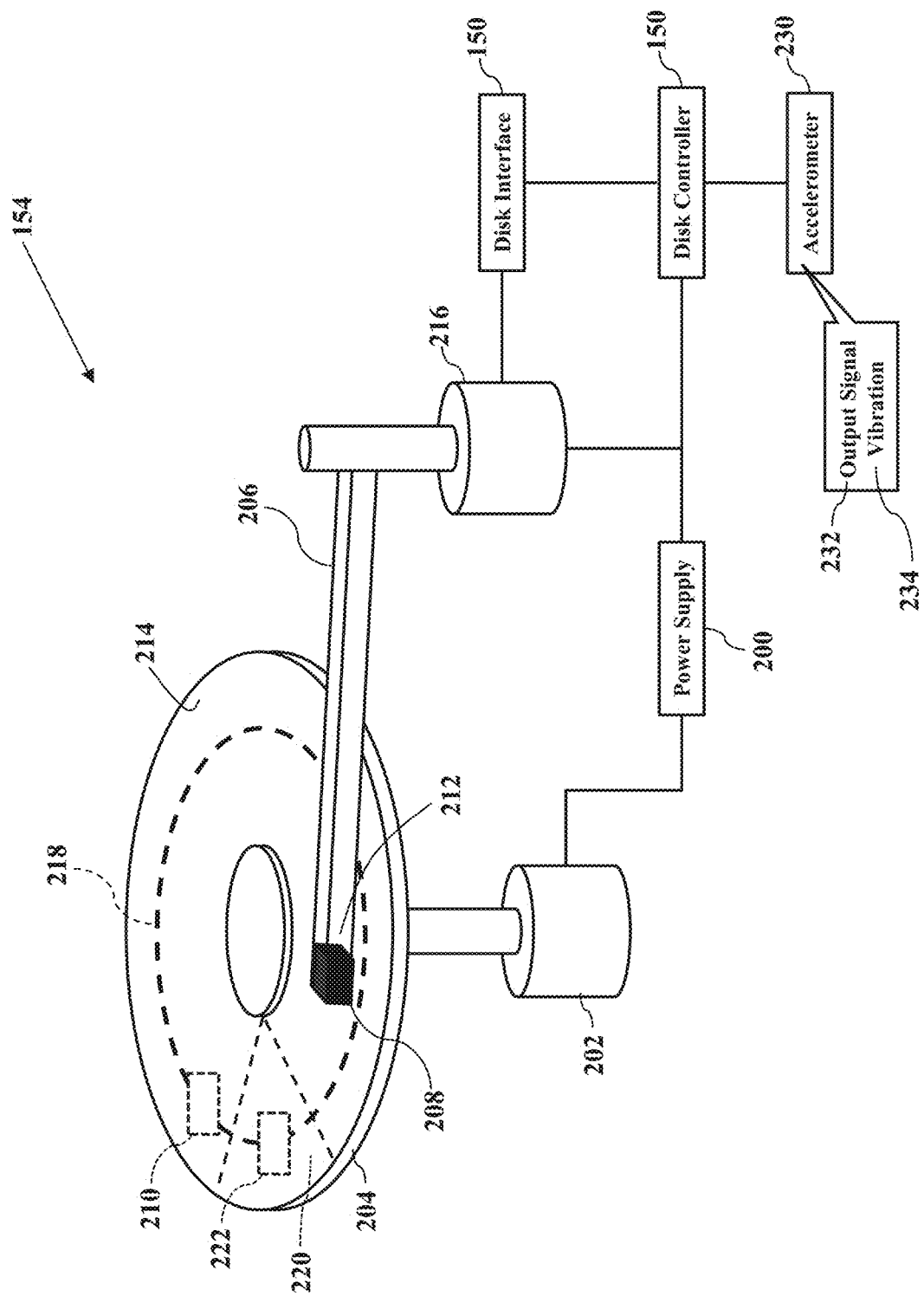
FIG. 2 illustrates a hard disk drive, according to exemplary embodiments.

FIG. 2 is a simplified illustration of the hard disk drive 154 that interfaces with the disk controller 150 and/or the disk interface 152. When the hard disk drive 154 receives an electrical power (perhaps from a power supply 200), a spindle motor or drive 202 spins a magnetic disk or platter 204. An arm 206 has an electromagnetic head or element 208 for writing data 210 to the disk 204. The head 208 is located proximate a tip 212 of the arm 206, and the head 208 is opposed to a write surface 214 of the disk 204. The arm 206 is driven by a motor 216 (such as a voice coil motor or VCM), which also receives the electrical power from the power supply 200. The arm 206 moves the head 208 in a radial direction of the disk 204 to access and/or to track one or more data tracks 218 on the disk 204. There may be a single, spiral data track 218 or multiple, concentric data tracks 218. One or more servo portions 220 of the disk 204 contain servo data 222.

The disk controller 150 also interfaces with an accelerometer 230. When the accelerometer 230 receives the electrical power from the power supply 200, the accelerometer 230 may generate an output signal 232 representing a movement, tilt, or vibration 234. The accelerometer 230 may be incorporated into the hard disk drive 154, or the accelerometer 230 may be a separate component (such as a component or input provided by the information handling system 100, illustrated in FIG. 1). The disk controller 150 reads or receives the output signal 232 representing the vibration 234.

Figure 3:
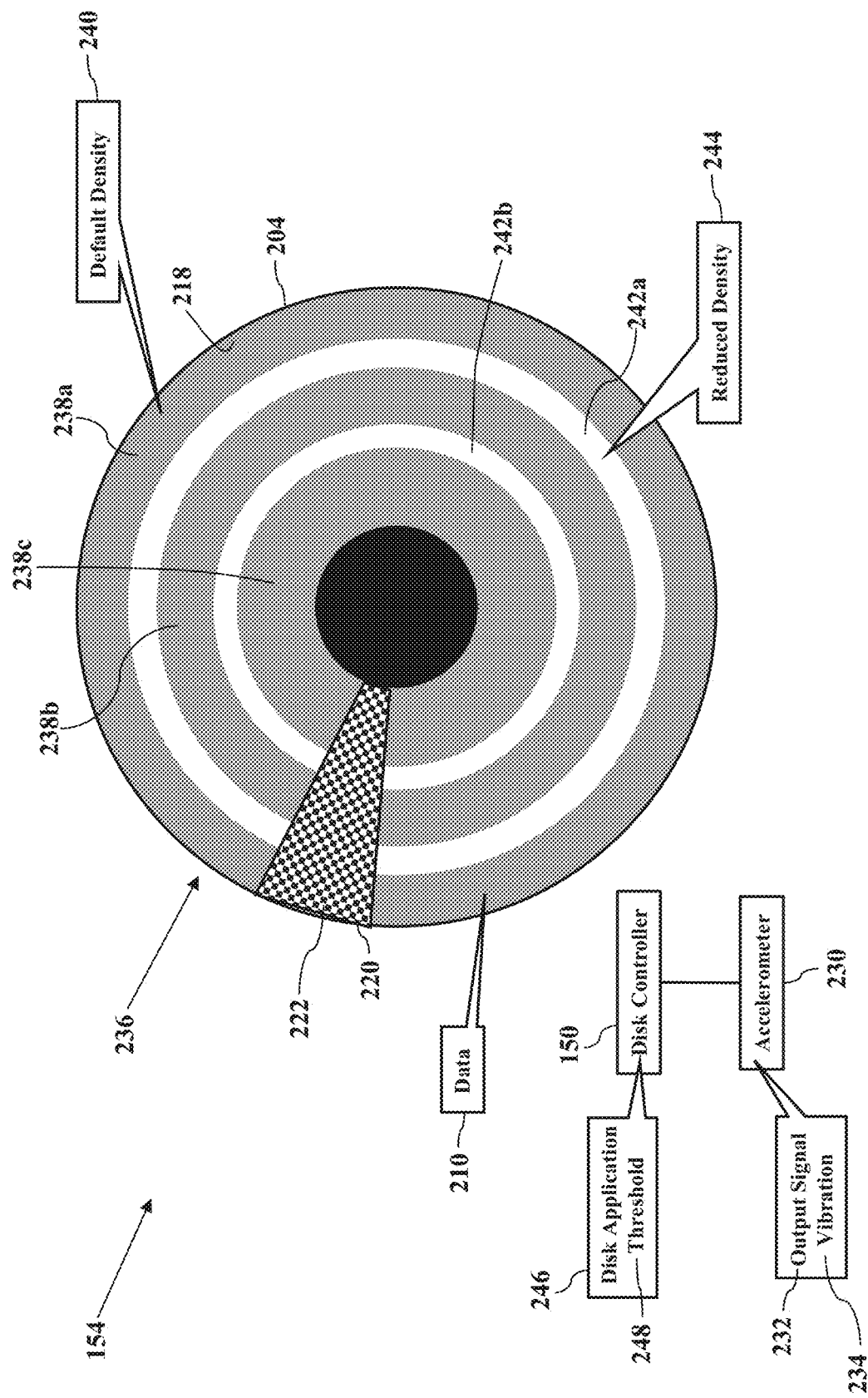
FIGS. 3-4 illustrate a vibration compensation scheme, according to exemplary embodiments.
Figure 4:
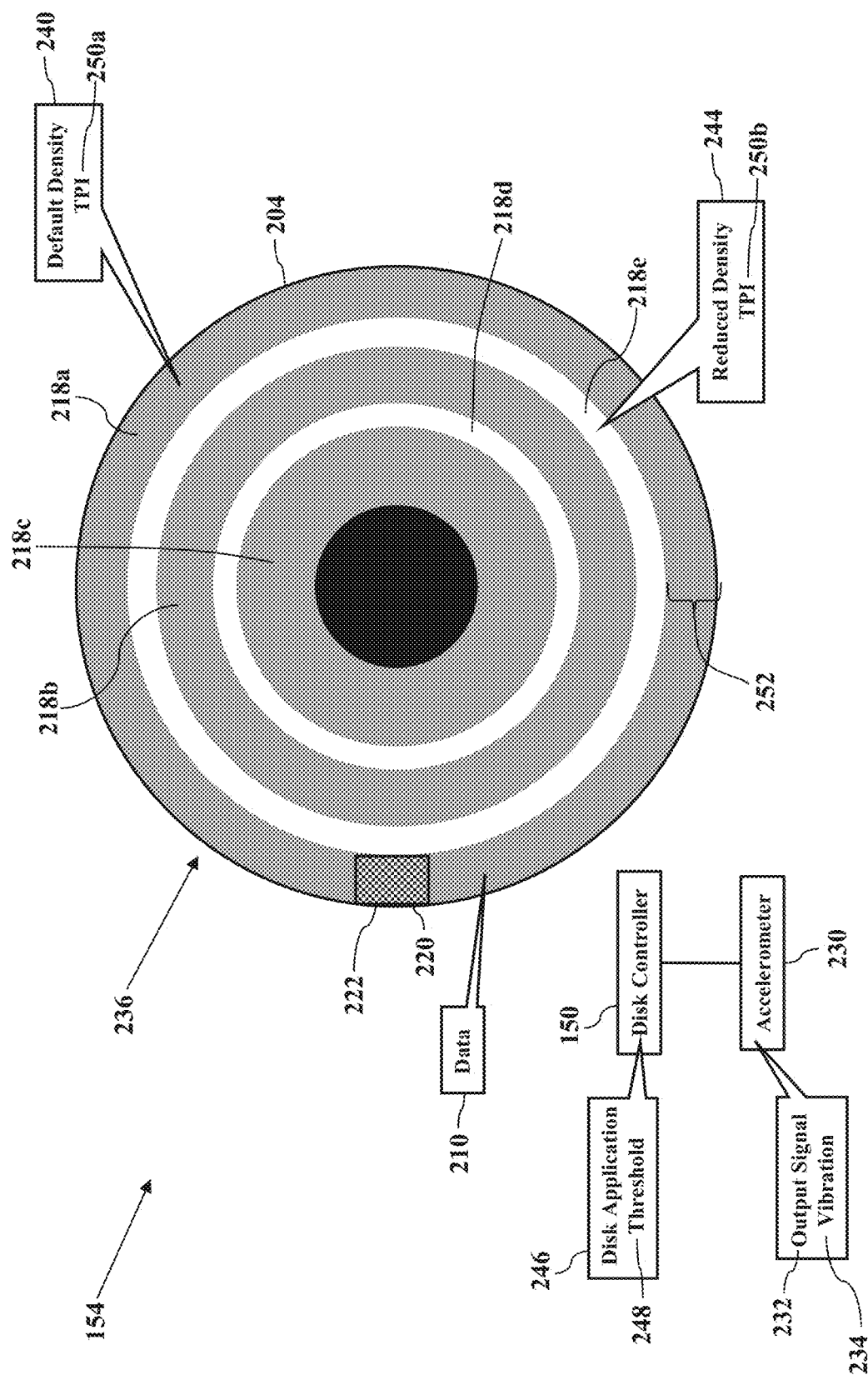

FIGS. 3-4 show the servo portion(s) 220 of the disk 204 (containing the servo data 222) that define the data densities of the data tracks 218, based at least in part on the output signal 232 generated by the accelerometer 230 representing the vibration 234. The servo data 222 defines a multi-zone layout 236 for the data tracks 218. That is, some of the zones 238 of the magnetic disk 204 are predefined for a default density 240 when writing the data 210. While there may be many (hundreds or thousands) of the zones 238, FIG. 3 only illustrates a simple example of three zones 238a-c formatted for the default density 240. Other zones 242, though, are predefined for a reduced or lower density 244 when writing the data 210. FIG. 3, again for simplicity, only illustrates two zones 242a-b formatted for the lower density 244. For example, the disk controller 150 may have a hardware processor and memory device (not shown for simplicity) that stores and executes a disk application 246. The disk application 246 instructs the disk controller 150 to receive or read the output signal 232 generated by the accelerometer 230 and compare to a threshold value 248. If the output signal 232 has a value (such as instantaneous or average) that is less than or equal to the threshold value 248, then perhaps the disk controller 150 infers that the vibration 234 is low (and/or within acceptable limits/ranges), so the disk controller 150 causes or instructs the head 208 (illustrated in FIG. 2) to write the data 210 within one or any of the zones 238a-c of the magnetic disk 204 that are predefined for the default density 240. However, if the output signal 232 is greater than the threshold value 248, then perhaps the disk controller 150 infers that the vibration 234 is high, so the disk controller 150 instructs the head 208 to temporarily write the data 210 within one or any of the other zones 242a-b formatted for the lower density 244.

FIG. 4 illustrates the data tracks 218. The user's data 210 is written to the data tracks 218. Again, while there may be hundreds or thousands of the data tracks 218, for simplicity FIG. 4 only illustrates five data tracks 218a-e. One or more portions, or sectors, of the data tracks 218 may be reserved or formatted as the servo portion(s) 220 containing the servo data 222. The servo data 222 may define the data densities of the data tracks 218. For example, a first set of the data tracks 218a-c are predefined and formatted at the default density 240. While the default density 240 may have any definition, parameter, or measurement, most readers are thought familiar with tracks per inch (or TPI) 250. The default density 240 may thus be defined as a high value of TPI 250a to increase the write/storage capacity of the first set of the data tracks 218a-c. However, a second set of the data tracks 218d-e are predefined and formatted for the lower density 244 (such as a lower value of the TPI 250b). When the vibration 234 is low (as determined by comparing the output signal 232 to the threshold value 248), the disk controller 150 instructs the head 208 to write the user's data 210 to any of the first set of the data tracks 218a-c predefined for the default density 240. The user's data 210, in other words, may be written/stored at the high value of the TPI 250a for maximum capacity. However, when the vibration 234 is determined, then the disk controller 150 instructs the head 208 to write the user's data 210 to any of the second set of the data tracks 218d-e predefined for the lower density 244. The lower density 244 (such as a lower value of the TPI 250b) may be chosen or configured for reducing write performance degradation from temporary external vibrations.

The multi-zone layout 236 thus presents an elegant solution. As the data capacity of the hard disk drive 154 increases, a width 252 of the data tracks 218 decreases, thus making the hard disk drive 154 more susceptible to the vibration 234. Even temporary thermal events that increase fan speeds pose challenges. The multi-zone layout 236 temporarily improves robustness to vibration events that may otherwise result in throughput degradation of data unavailability.

The servo data 222 thus establishes or preconfigures the multi-zone layout 236 for the hard disk drive 154. The servo data 222 formats the disk 204 with the data tracks 218 having at least two different densities (such as the default density 240 and the reduced/lower density 244). Any configurable portion of the data tracks 218 may be formatted to write the data 210 at the default density 240, while some remaining portion of the data tracks 218 may be configured and formatted to write the data 210 at the lower density 244. Because the data tracks 218d-e are formatted with additional physical gaps between sectors and/or between adjacent data tracks 218a-c, these zones 242 or areas exhibit an increased margin against the external vibration 234. The data tracks 218d-e formatted at the lower density 244 thus increase the physical dimension of the track overwrite limit. Whenever firmware (such as the disk application 246) determines the vibration 234 may cause a write performance issue (such as when the output signal 232 exceeds the threshold value 248), the disk controller 150 and/or the hard disk drive 154 may reallocate the data 210 to one of the zones 242 or data tracks 218d-e reserved for temporary vibratory events.

Figure 5:
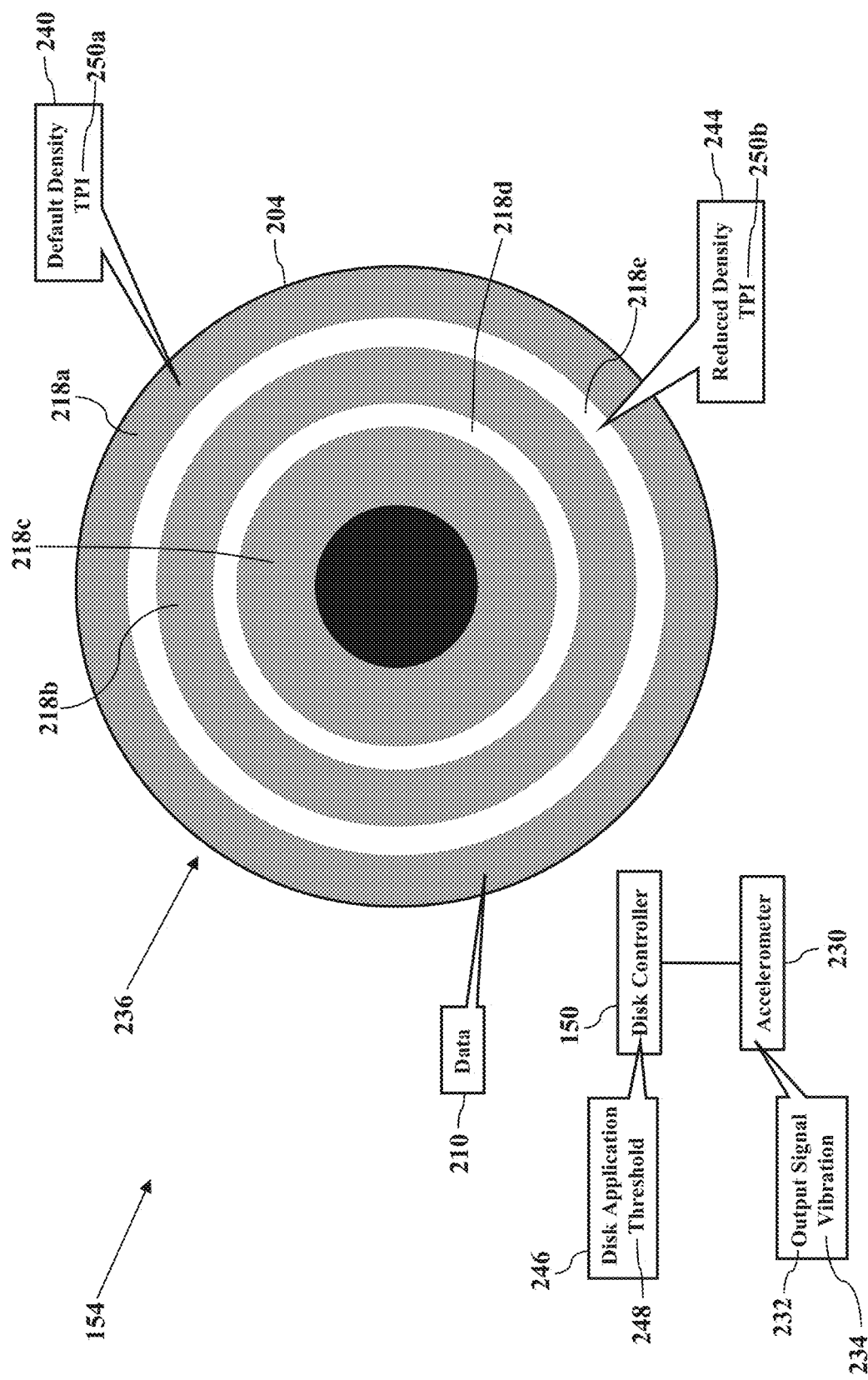
FIG. 5 illustrates a dynamic vibratory write scheme, according to exemplary embodiments.

FIG. 5 illustrates a dynamic vibratory write scheme, according to exemplary embodiments. Whenever the vibration 234 is detected (based on the output signal 232 generated by the accelerometer 230), the disk controller 150 and/or the hard disk drive 154 switches from the data tracks 218a-c formatted at the default density 240 to the other data tracks 218d-e formatted at the lower density 244. However, the disk controller 150 and/or the hard disk drive 154 may continually or periodically monitor the output signal 232 generated by the accelerometer 230. Whenever the value of the output signal 232 equals or falls below the threshold value 248, then the disk controller 150 and/or the hard disk drive 154 may infer that the vibratory event has ended and/or the vibration 234 has returned to normal levels. The disk controller 150 and/or the hard disk drive 154 may thus switch back to writing the user's data 210 to the data tracks 218a-c formatted at the default density 240.

Switching may occur at capacity. When the data tracks 218e-d formatted at the lower density 244 are full or consumed, the disk controller 150 and/or the hard disk drive 154 may switch back to writing the user's data 210 to the data tracks 218a-c formatted at the default density 240. As a precaution, then, the data tracks 218d-e formatted at the lower density 244 may thus not be overwritten.

Figure 6:
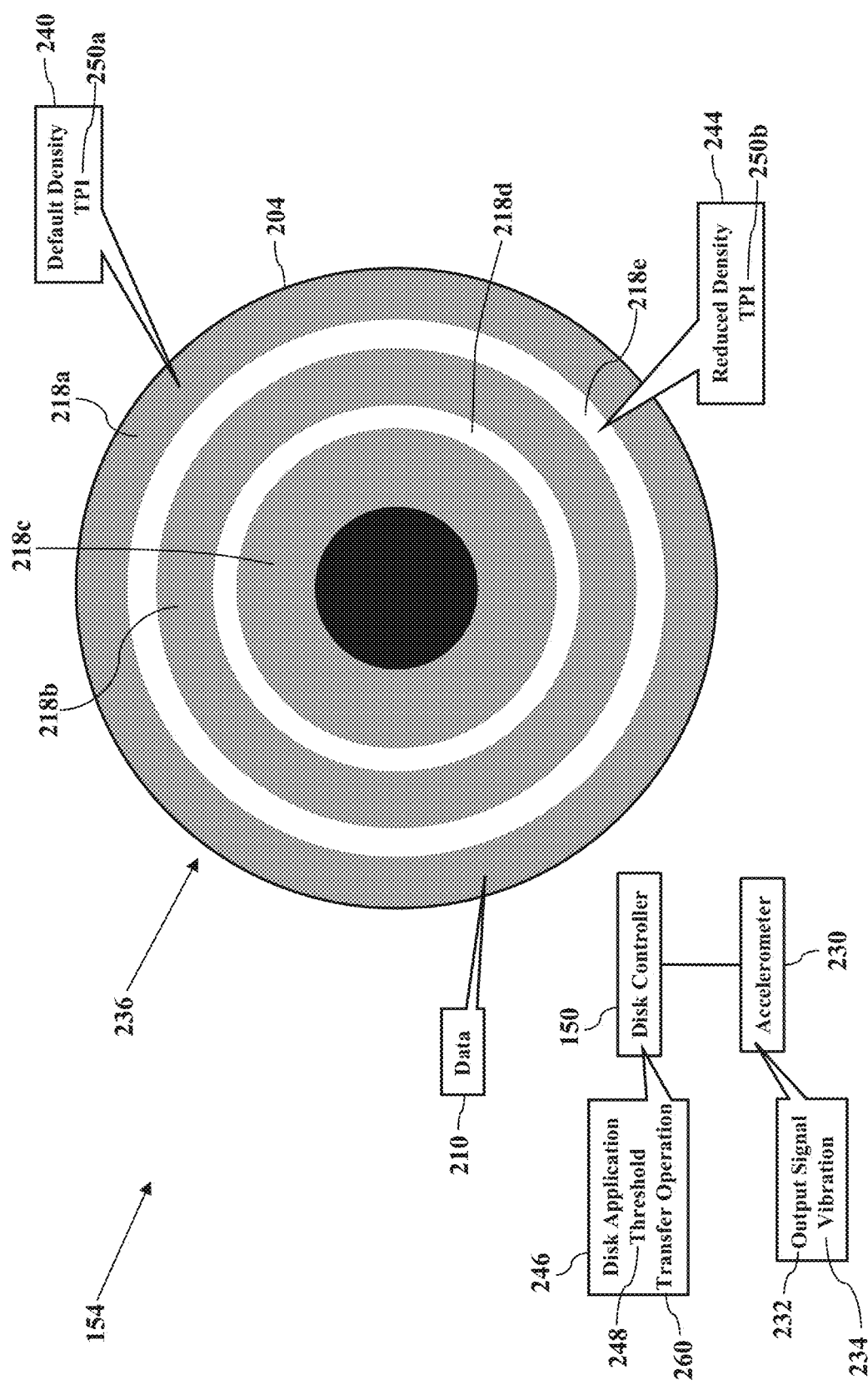
FIG. 6 illustrates a transfer operation, according to exemplary embodiments.

FIG. 6 illustrates a transfer operation 260, according to exemplary embodiments. Any of the user's data 210 written to the data tracks 218d-e (formatted at the lower density 244) may be moved, or transferred, to the data tracks 218a-c (formatted at the default density 240). The user's data 210, in other words, may be read from the data tracks 218d-e formatted at the lower density 244 and rewritten to the data tracks 218a-c formatted at the default density 240. This transfer operation 260 of the user's data 210 keeps the data tracks 218d-e (formatted at the lower density 244) available for new or subsequent vibratory events. Moreover, after the user's data 210 is transferred to the high capacity data tracks 218a-c (formatted at the default density 240), the data tracks 218d-e formatted at the lower density 244 may be erased or cleared in preparation for a future vibration event. The user's data 210, in other words, may be safely deleted or overwritten once the transfer operation 260 is complete.

Write switching may dynamically occur. During a vibratory event, the disk controller 150 may nearly instantaneously or in near real time switch and write the user's data 210 to the low capacity data tracks 218d-e (formatted at the lower density 244). The multi-zone layout 236 of the hard disk drive 154 temporarily improves robustness to during the vibratory event to improve a robustness in write operations. When the vibration 234 settles down to a normal range of values (as determined by the threshold value 248), the disk controller 150 may nearly instantaneously or in near real time switch and revert to writing the user's data 210 to the high capacity data tracks 218a-c (formatted at the default density 240). Moreover, when the vibration 234 is observed as normal, the disk controller 150 may initiate and execute the transfer operation 260 to move any of the user's data 210 from the low capacity data tracks 218d-e to the high capacity data tracks 218a-c.

Figure 7:
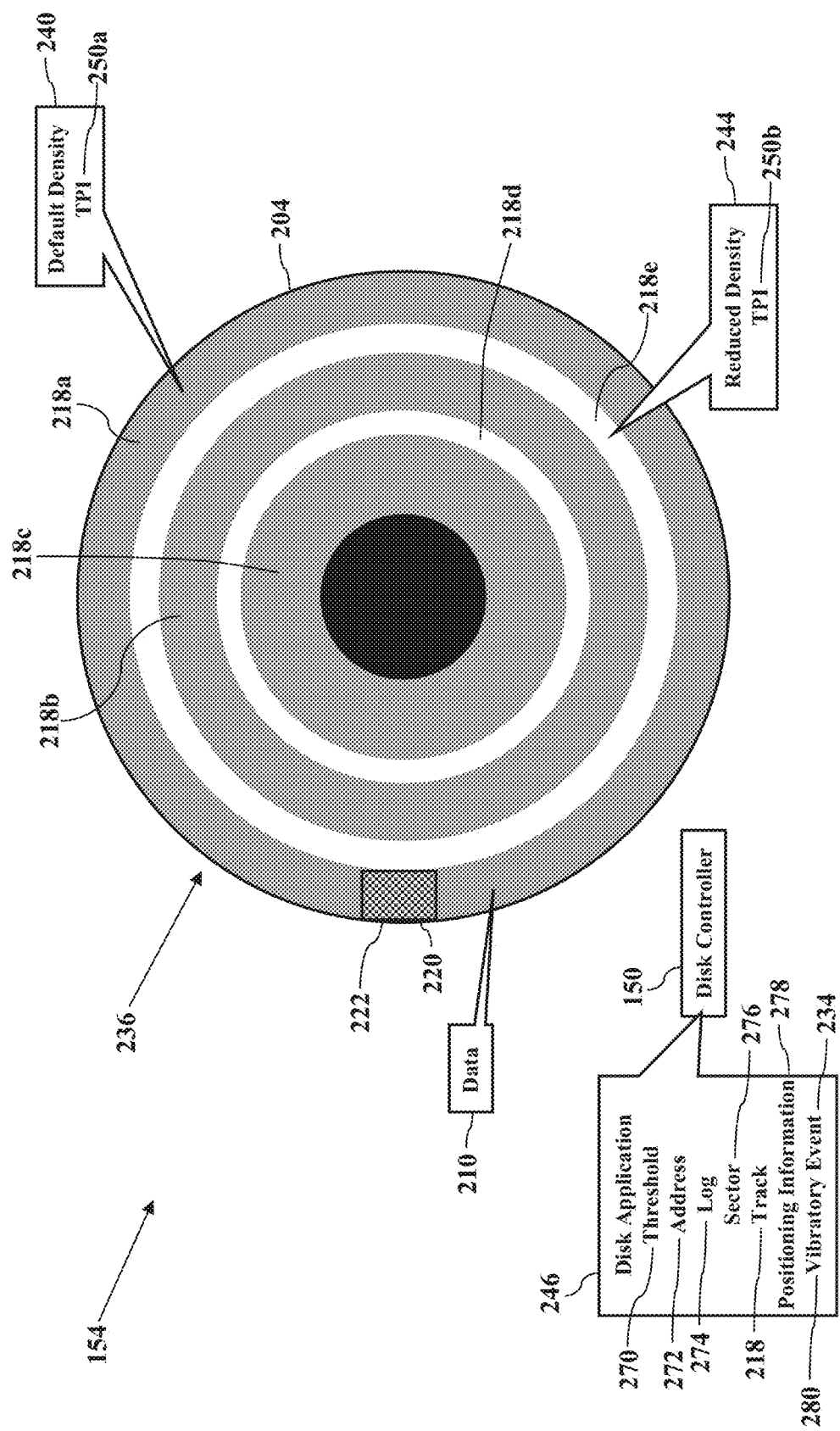
FIG. 7 further illustrates the vibration compensation scheme, according to exemplary embodiments.

FIG. 7 further illustrates the vibration compensation scheme, according to exemplary embodiments. Here the vibration 234 may be determined from the servo data 220. The servo data 220 may also define a performance threshold 270 for writing the data 210. That is, as the data 210 is written to the disk 204, the disk controller 154 may track the data 210 and its corresponding address 272 within the disk 204. The disk controller 154 may thus maintain an electronic log 274 of the data 210 written to each storage sector 276 within the data track 218. As the user's data 210 is written to the sectors 276, the servo data 220 predefines positioning information 278 (such as a sector identifier and a track identifier) for each sector 276 and data track 218. The disk controller 154 may even track the positioning information 278 for the arm 206 and/or the electromagnetic head 208 (illustrated in FIG. 2). During a vibratory event 280, the arm 206 and/or the electromagnetic head 208 may be inadvertently jolted from a current sector 276 to a neighboring sector 276 and/or to a neighboring data track 218. As the disk controller 154 monitors the positioning information 278, the electronic log 274 reveals sector 276 and/or track 218 inconsistencies that may indicate the arm 206 and/or the electromagnetic head 208 has skipped off a current data track 218 and/or sector 276 to any adjacent sector 276 and/or data track 218. If the positioning information 278 exceeds the performance threshold 270 (perhaps indicating an instability), then the disk controller 154 may infer the vibratory event 280 (such as the vibration 234) and switch to writing the user's data 210 to the low capacity data tracks 218*d-e*. When the positioning information 278 equals or is less than the performance threshold 270, then the disk controller 154 may infer that the positioning information 278 is stable and the user's data 210 is written to the high capacity data tracks 218*a-c*. The disk controller 154 may thus dynamically and/or temporarily switch between the high capacity data tracks 218*a-c* and the low capacity data tracks 218*d-e* based on the positioning information 278.

Figure 8:
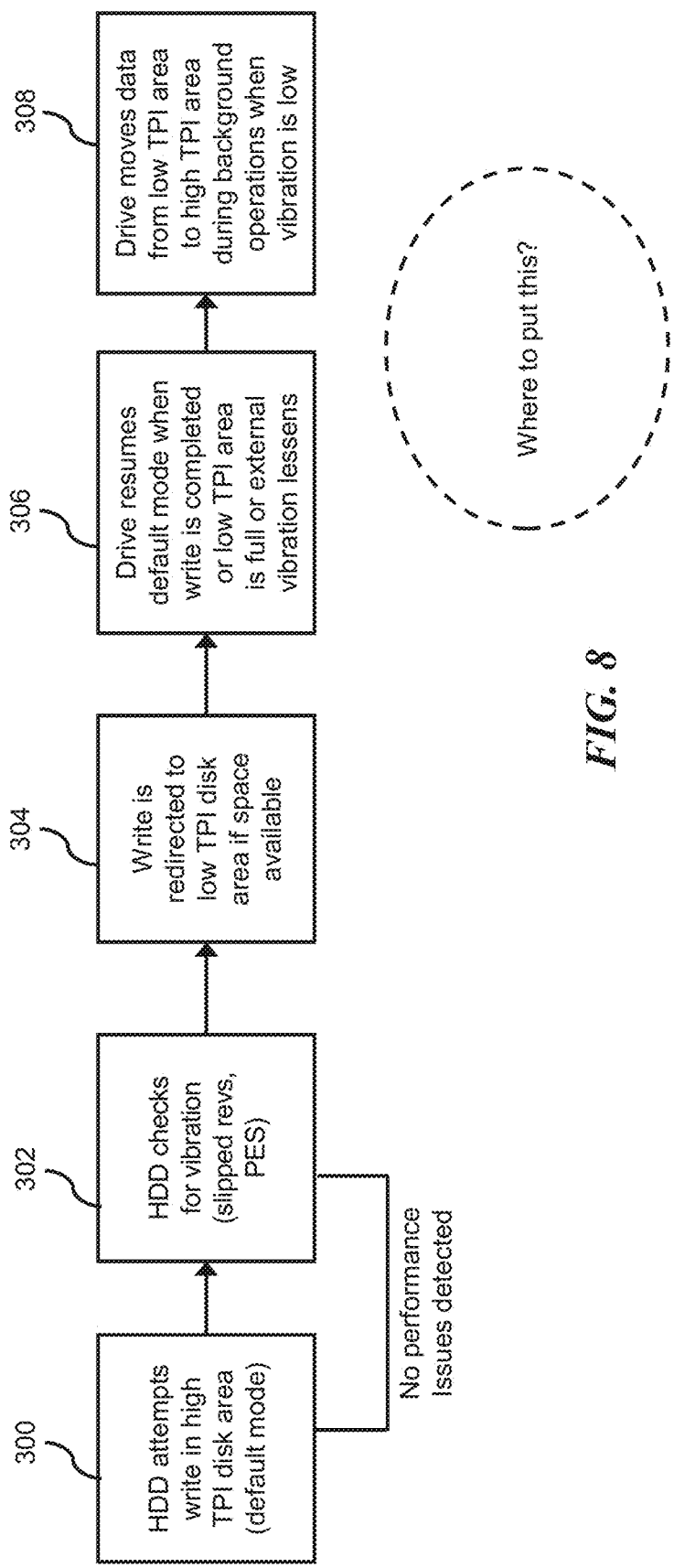
FIG. 8 is a flowchart illustrating a method or algorithm for reducing write degradation during temporary external vibrations, according to exemplary embodiments.

FIG. 8 shows a method or algorithm for reducing write degradation during temporary external vibrations, according to exemplary embodiments. The hard disk drive 154 defaults to writing the user's data 210 to any high capacity area (Block 300). The hard disk drive 154 checks for the vibration 234 and/or the vibratory event 280 (Block 302). If no vibration is determined, then the hard disk drive 154 continues writing the user's data 210 to any of the high capacity areas (Block 300). However, if the vibration 234 and/or the vibratory event 280 is detected, then the hard disk drive 154 redirects the write operation to any low capacity area, depending on available storage capacity (Block 304). The hard disk drive 154 later resumes the default mode and writes to any of the high capacity areas, depending on execution, vibration, and/or capacity (Block 306). The hard disk drive 154 transfers the user's data from the low capacity area to the high capacity area when the vibration is normal (Block 308).

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A hard disk drive, comprising:
   a disk including a servo region and data tracks, the servo region having a servo data for formatting the data tracks of the hard disk drive, the servo data formatting at least one of the data tracks for a high capacity storage and the servo data formatting at least one other of the data tracks for a low capacity storage;
   an accelerometer for generating an output signal indicating a vibration; and
   a head for writing user data to the data tracks based on the output signal indicating the vibration, wherein the head writes the user data to the one track for the high capacity storage in response to the output signal generated by the accelerometer being less than a threshold value, and the head writes the user data to the other track for the low capacity storage in response to the output signal generated by the accelerometer being greater than or equal to the threshold value.

2. The hard disk drive of claim 1, wherein the servo data defines a tracks per inch associated with the high capacity storage.

3. The hard disk drive of claim 1, wherein the servo data defines a tracks per inch associated with the low capacity storage.

4. The hard disk drive of claim 1, wherein the servo data defines a width of the at least one track for the high capacity storage.

5. The hard disk drive of claim 1, wherein the servo data defines a width of the at least one other track for the low capacity storage.

6. The hard disk drive of claim 1, wherein the head switches writing from the high capacity storage to the low capacity storage in response to the output signal generated by the accelerometer indicating the vibration.

7. The hard disk drive of claim 1, wherein the head switches writing from the low capacity storage to the high capacity storage in response to the output signal generated by the accelerometer indicating the vibration.

8. A system, comprising:
   a hardware processor;

a memory device storing instructions that when executed cause the hardware processor to perform operations, the operations including:
  reading a servo data in a servo region of a hard disk drive, the servo data for formatting data tracks of the hard disk drive at a default density, and the servo data for formatting other data tracks of the hard disk drive at a lower density than the default density;
  receiving an output signal generated by an accelerometer, the output signal representing a vibration;
  comparing the output signal generated by the accelerometer to a threshold value;
  in response to the output signal generated by the accelerometer being less than the threshold value, then determining that the vibration is normal and directing the hard disk drive to write a user data to the data tracks formatted at the default density; and
  in response to the output signal generated by the accelerometer being greater than or equal to the threshold value, then determining that the vibration is not normal and directing the hard disk drive to write the user data to the other data tracks formatted at the lower density.

9. The system of claim 8, wherein the operations further include defining the default density as tracks per inch.

10. The system of claim 8, wherein the operations further include defining the lower density as tracks per inch.

11. The system of claim 8, wherein the operations further include defining the default density as a width of the data tracks.

12. The system of claim 8, wherein the operations further include defining the lower density as a width of the other data tracks.

13. The system of claim 8, wherein the operations further include resuming writing the data to the data tracks at the default density in response to the other data tracks being full.

14. The system of claim 8, wherein the operations further include resuming writing the data to the data tracks at the default density in response to the output signal being equal to the threshold value.

15. The system of claim 8, wherein the operations further include moving the data from the other data tracks to the data tracks during times when the acceleration is low.

16. A memory device storing instructions that when executed cause a hardware processor to perform operations, the operations including:
  reading servo data in a servo region of a disk of a hard disk drive, the servo data for formatting a first set of data tracks at a default density, and the servo data for formatting a second set of the data tracks at a density lower than the default density;
  receiving an output signal generated by an accelerometer, the output signal representing a vibration;
  comparing the output signal generated by the accelerometer to a threshold value; and
  if the output signal generated by the accelerometer is less than the threshold value, then determining that the vibration is normal and directing the hard disk drive to write to the first set of the data tracks at the default density, otherwise determining that the vibration is not normal and directing the hard disk drive to write to the second set of the data tracks at the lower density.

17. The memory device of claim 16, wherein the operations further include resuming writing the data to the first set of the data tracks at the default density in response to the second set of the data tracks being full.

18. The memory device of claim 16, wherein the operations further include resuming writing the data to the first set of the data tracks at the default density in response to the output signal being equal to the threshold value.

19. The memory device of claim 16, wherein the operations further include moving the data from the second set of the data tracks to the first set of the data tracks.

20. The memory device of claim 16, wherein the operations further include moving the data from the second set of the data tracks to the first set of the data tracks during times when the vibration is normal.

* * * * *